UNITED STATES PATENT OFFICE.

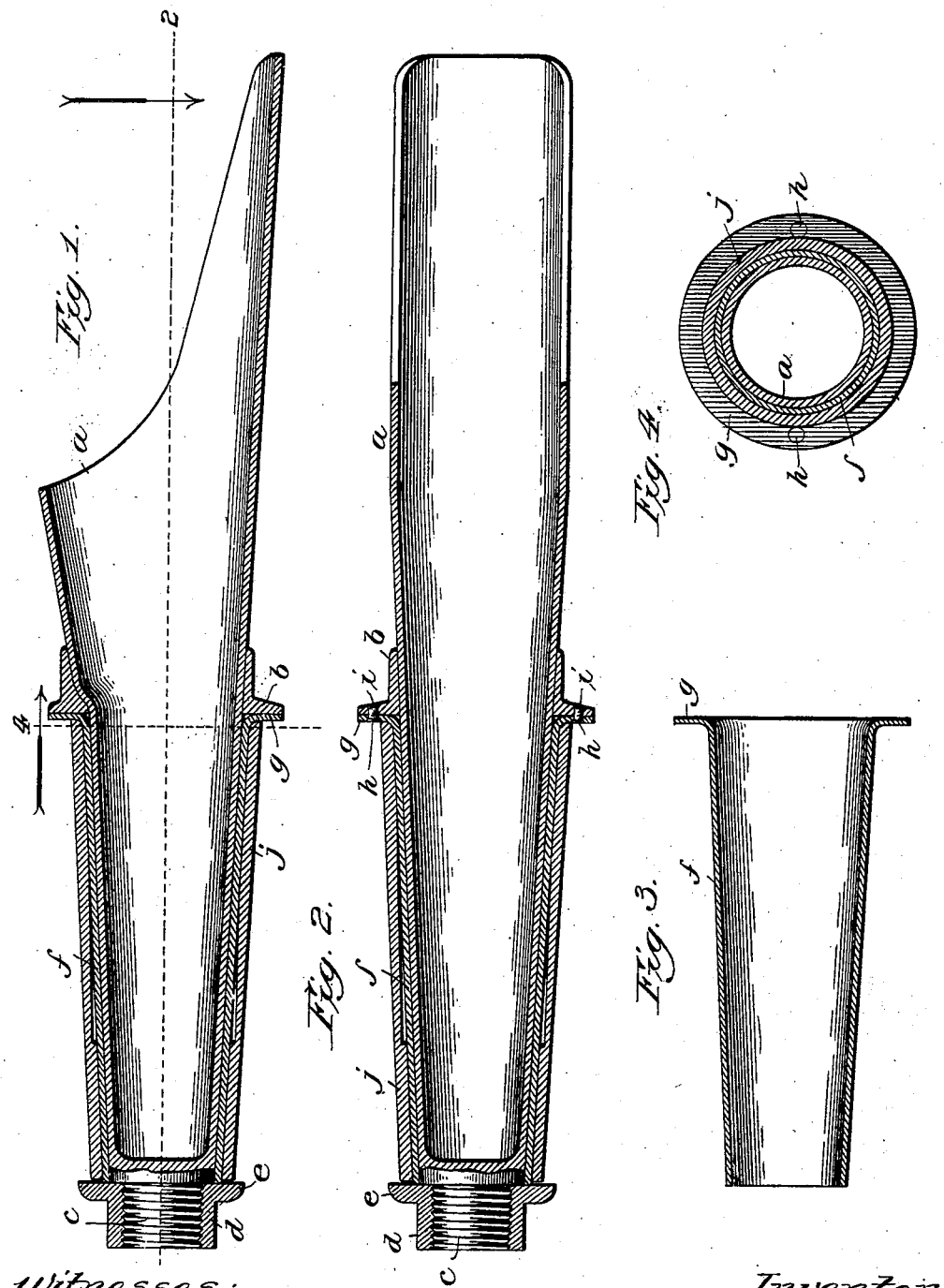

ALFRED L. MOORE, OF MOLINE, ILLINOIS.

WAGON-SKEIN.

SPECIFICATION forming part of Letters Patent No. 698,844, dated April 29, 1902.

Application filed September 11, 1901. Serial No. 75,113. (No model.)

*To all whom it may concern:*

Be it known that I, ALFRED L. MOORE, a citizen of the United States, residing at Moline, in the county of Rock Island and State of Illinois, have invented certain new and useful Improvements in Wagon-Skeins, of which the following is a specification.

The invention relates to that type of wagon-skein which is adapted to encircle a vehicle-axle, and particularly to that class of skeins which have a sleeve removably mounted thereon and adapted to form a bearing for the wheel.

The principal object of the invention is to provide a simple, economical, and efficient skein with a removable metallic sleeve adapted to extend within the hub of a wheel mounted thereon and form a bearing therefor.

A further object of the invention is to provide means for removably mounting such sleeve upon the body portion of the skein, whereby it may be readily removed when worn and replaced with but little labor and expense.

A further object of the invention is to provide a shoulder upon such removable sleeve adapted to form a bearing against the side motion of the wheel and be readily removable with such sleeve.

A further object is to provide means for making the body portion of a skein of a comparatively cheap material and the bearing of a high grade of steel.

Further objects of the invention will appear from an examination of the drawings and the following description and claims.

In the accompanying drawings, Figure 1 is a longitudinal sectional elevation of a skein provided with my improved removable sleeve, showing the bearing-box mounted thereon. Fig. 2 is a longitudinal sectional plan view thereof, taken on line 2 of Fig. 1; Fig. 3, a longitudinal section of my improved sleeve; and Fig. 4, a cross-sectional view of the sleeve, skein, and bearing-box, taken on line 4 of Fig. 1.

In constructing a skein in accordance with my improvements I provide a body portion $a$ of the ordinary and well-known type, having an annular shoulder $b$, preferably sweated thereon, and having an extended end portion $c$, threaded and adapted to receive the screw-threaded nut $d$ thereon. This nut is provided with an annular flange or shoulder $e$, adapted to form the outer end bearing for the hub or wheel when in operative position. Between the inner shoulder $b$ and the nut the body portion of the skein is preferably reduced and the diameter thereof gradually diminished toward the outer end, so as to have the same general contour as that of the bearing-sleeve mounted thereon and the inner surface of the wheel-boxing. Upon the reduced portion of the skein and abutting against the annular shoulder is removably mounted an encircling steel sleeve $f$, provided at its inner end with an annular flange $g$, integral with such sleeve and adapted to contact the shoulder $b$ upon the body portion of the skein. In order to hold the removable sleeve in position, the flange thereon is provided with perforations $h$ and the shoulder adjacent thereto with perforations $i$, through which rivets are inserted to form a rigid and secure connection between the sleeve and body portion of the skein. It will thus be readily apparent that the sleeve is adapted to fit into the bearing-box $j$ and form the inner and end bearing for the same, and that when such sleeve is worn so as to cause an undesirable amount of play between the hub and the skein it may be readily removed and replaced by a new one.

It will of course be understood that, although my improved steel sleeve may be used in connection with a body portion of a different and cheaper material, such as cast or malleable iron, its use is by no means confined to such a combination; but, on the contrary, it may be used upon a steel body portion as well as upon malleable or cast iron, and in any case it has the advantage of furnishing a bearing tempered suitably for wear in such capacity and a body portion tempered suitably to endure the strains to which it is necessarily subjected.

The advantages incident to my improvement are, first, that it enables the use of a cast or malleable iron skein in connection with a removable steel bearing-surface, whereby all of the advantages of a steel skein are obtained with much less cost than that of a steel skein, also enabling the bearing-surface to be tempered suitably to withstand the wear and the body portion of the skein to be tempered suitably to withstand the heavy strains to which it is necessarily subjected; second, that it provides a steel bearing-surface for both the inner and end play of the wheel, both of which bearing-surfaces may be readily removed when worn and replaced with but slight trouble and expense, and, third, that it practically dispenses with the necessity of providing a new skein for any vehicle on which it may be used and provides a means for reducing the undesirable and excessive play of the wheel upon the worn skein without the expense of providing a new one.

I claim—

1. In a wagon-skein, the combination of a hollow body portion adapted to be mounted upon and encircle an axle, a cylindrical sleeve adapted to form a wheel-bearing removably and non-rotatably mounted thereon and provided with an annular flange upon its inner end for forming an end bearing, an extended screw-threaded end upon the body portion of the skein, and a nut mounted thereon and provided with an annular shoulder for forming opposite the shoulder formed by the flange an end bearing, substantially as described.

2. In a wagon-skein, the combination of a body portion adapted to be mounted upon an axle, a cylindrical sleeve removably and non-rotatably mounted upon such body portion, an annular flange integral with such sleeve, and means for connecting the annular flange to the shoulder on the body portion, substantially as described.

3. In a wagon-skein, the combination of a body portion adapted to be mounted upon an axle and provided with an annular shoulder and an extended screw-threaded end, a threaded nut mounted upon the threaded end of such body portion and provided with an annular shoulder, a removable steel sleeve non-rotatably mounted upon the body portion between the shoulder and the nut, an integral annular flange upon one end of the sleeve, and means for connecting the annular flange to the shoulder, substantially as described.

ALFRED L. MOORE.

Witnesses:
GEORGE L. BRUMBAUGH,
FRANK H. GLUESING.